United States Patent Office 3,748,272
Patented July 24, 1973

3,748,272
DESICCANTS WITH MOISTURE INDICATOR
Adolf Wenz, Karlheinz, Neissius, and Alois Litters, Darmstadt, Germany, assignors to Merck Patent Gesellschaft mit beschrankter Haftung, Darmstadt, Germany
No Drawing. Filed Sept. 11, 1970, Ser. No. 71,374
Claims priority, application Germany, Sept. 12, 1969, P 19 46 277.2
Int. Cl. C09k 3/00
U.S. Cl. 252—194                                  6 Claims

ABSTRACT OF THE DISCLOSURE

Desiccant compositions containing as a desiccant concentrated sulfuric acid or phosphorus pentoxide, in admixture with a solid carrier and a dyestuff which exhibts a different color in the presence of hydrated desiccant, e.g., 1-hydroxy-4-(2-sulfo - 4,6 - dinitrophenylazo)-naphthalene when sulfuric acid is employed as desiccant and neutral red when phosphorus pentoxide is employed.

BACKGROUND OF THE INVENTION

This invention relates to desiccants having a moisture indicator.

Desiccants in admixture with solid carriers exhibit practical advantages compared to the pure inorganic acids or acid anhydrides, e.g., concentrated sulfuric acid or phosphorus pentoxide, used customarily as desiccants heretofore. Such desiccants have been available commercially for some time. They are utilized in the lavoratory as a desiccator charge and for drying of flowing gases and in other situations where traces of moisture are to be removed from gases or closed spaces. During use, the desiccant becomes less effective as water is absorbed and eventually it becomes ineffective.

A definite disadvantage of the conventional desiccants is that it has not been heretofore possible to detect a drop in their efficiency in a simple manner. Accordingly, there is always the danger that the desiccant is used too long so that it does not fulfill its purpose, or it is discarded too early, i.e., it is not employed economically.

OBJECTS OF THE INVENTION

It is an object of this invention to provide a solution to the problem of recognizing in a simple manner when the desiccant is exhausted. It is another object to provide novel color-indicating desiccant compositions. Other objects will be apparent to those skilled in the art to which this invention pertains.

SUMMARY OF THE INVENTION

The compositions of this invention consist essentially of concentrated sulfuric acid or phosphorus pentoxide in admixture with a solid carrier and a dyestuff. The dyestuffs employed as the moisture indicator are those which with fresh desiccant exhibit a color different from that when desiccant is no longer effective.

DETAILED DISCUSSION

The dyestuff is admixed with unconsumed desiccant either in dissolved or undissolved form. The dyestuff produces a coloration or, alternatively, leaves the color of the desiccant unchanged. Increased adsorption of water causes a color change, or coloring of the desiccant, this color change being clearly noticeable. The color change or coloring is effected positively by the water absorption of the desiccant. The properties of the desiccant which are changed by the absorbed water have a chemical or physical effect on the moisture indicator.

The dyestuffs employed as humidity indicators in the compositions of the invention are preferably employed in an amount of 0.001% to 1%. In preferred embodiments, approximately 0.01% of dyestuff is contained in the mixture, thus reaching a satisfactory compromise between an economical use of the dyestuff and a highly contrasting color change.

The dyestuffs employed as the humidity indicators can be selected from many classes of dyestuffs. However, they must be stable with respect to the desiccant and must exhibit the required color change. Examples of classes of dyestuffs which can be employed are azo, triphenylmethane, phthalein, phenothiazine, phenazine, as well as other classes of dyestuffs. For desiccants containing concentrated sulfuric acid, azo dyes, preferably acidic azo dyes with phenolic hydroxyl groups, have proved to be especially advantageous. Especially well suited are, for example, 1-hydroxy-4-(2-sulfo-4,6-dinitrophenylazo)-naphthalene;
1-hydroxy-2-(2,4-dinitrophenylazo)-naphthalene-disulfonic acid-(3,6);
1-hydroxy-2-[4-(2-hydroxysulfonyloxy-ethanesulfonyl)-2-nitrophenylazo]-naphthalene-disulfonic acid-(3,6); and
1-hydroxy-4-[4-(2-hydroxysulfonyloxy-ethanesulfonyl)-2-nitrophenylazo]-naphthalene.

For the desiccants containing phosphorus pentoxide, suitable dyestuffs include neutral, basic and acidic organic dyes. In particular, neutral red (3-amino-6-dimethyl-amino-2-methylphenazine hydrochloride), methyl orange (sodium 4-dimethylamino azobenzene - 4' - sulfonate), metanil yellow, 1-hydroxy-4-(2-sulfo-4,6-dinitrophenylazo)-naphthalene, phenolphthalein, phenol red (3,3-bis-(p-hydroxyphenyl) - 3H - 2,1-benzoxathiole 1,1-dioxide), bromophenol blue (3,3',5,5' - tetrabromophenolsulfonphthalein), methylene blue (3,7-bis(dimethylamino)-phenazathionium chloride), patent blue, aniline blue, crystal violet, and malachite green have proved to be well suited for the purpose of this invention.

The desiccants employed in the desiccant compositions of this invention are concentrated sulfuric acid or phosphorus pentoxide.

Preferred solid carries are perlite, especially the processed perlite which is available commercially, for example, under the name of "Superlite," or similar volcanic glasses. Also suitable are kieselguhr, vermiculite (with $P_2O_5$), or other colorless or only slightly tinted mineral substances which can be processed, together with inorganic acids or acid anhydrides, into pulverized, fluid mixtures. In a preferred embodiment, the desiccant compositions of this invention are employed in the form of porous shaped bodies.

Basically, all mixture ratios of concentrated sulfuric acid or phosphorus pentoxide and the solid carriers can be employed in the desiccant compositions of this invention. However, mixtures of 65% to 85% of the desiccants and 35% to 15% of the carrier materials are preferably used, since these mixtures are flowable, i.e. pourable, non-conglomerated mixtures. Mixtures of about 75% of sulfuric acid or phosphorus pentoxide and about 25% of processed perlite have proved to be particularly suitable.

The desiccant compositions of this invention can be used for the removal of traces of moisture from closed-off spaces or gases, especially also flowing gases. They can likewise be employed for the drying or moisture protection of drugs, foodstuffs, chemicals, or other articles, for example technical components, during the manufacture or storage thereof. For this purpose, the material to be dried or protected against moisture is deposited, together with the desiccant composition, in moisture-proof vessels or containers, which optionally can also be evacuated. In this way, it is possible, for example, to eliminate troublesome surface films of water. A preferred application resides in filling transparent tubes or containers with the desiccants of this invention and passing gases, which are to be freed of traces of humidity, therethrough. During this proces, it is possible, according to the invention, to observe the effectiveness of the desiccant by observing its coloring. This is of particular advantage in case of closed apparatus or circulating systems. Conventional drying pipes for the protection of pressure equalizing apertures provided in apparatus which are themselves moisture-sensitive, or the contents of which are sensitive to moisture, are advantageously filled with a desiccant composition of this invention. Specific fields of application are the charging of drying pipes for freeze drying apparatus or apparatus for the production of high-purity gases, for example nitrogen, helium, hydrogen, oxygen.

Particular economy is attained by the fact that the end point of the effectiveness of the desiccants can readily be recognized according to this invention. In order to increase this economy further, it is advantageous to employ the desiccants of this invention in as thin a layer as possible, and to exchange them frequently. The latter is feasible because the end point of effectiveness of the desiccant is easily observed.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

All percentages set forth above and hereinbelow are percent by weight.

EXAMPLE 1

(a) 0.1 g. of 1-hydroxy-4-(2-sulfo-4,6-dinitrophenylazo)-naphthalene is dissolved in 750 g. of 96% sulfuric acid, and mixed with 250 g. of processed perlite ("Superlite E/70" of Deutsche Perlite GmbH). A flowable powder is obtained having a vigorous red-violet color, the hue of which changes into pale violet after the absorption of about 40% of water. Upon the absorption of another 10% of water, the mixture becomes colorless, or assumes the tint of the desiccant without the dye.

By the use of the following dyes, analogous desiccant compositions can be produced according to the above procedure:

(b) 1 - hydroxy-2-(2,4-dinitrophenylazo)-naphthalene-disulfonic acid-(3,6). The color change after the absorption of 25% of water is from violet to yellow.

(c) 1 - hydroxy-2-[4-(2-hydroxysulfonyloxy-ethanesulfonyl) - 2 - nitrophenylazo]-naphthalene-disulfonic acid-(3,6). The color change after the absorption of 15% of water is from violet to yellow.

(d) 1 - hydroxy-4-[4-(2-hydroxysulfonyloxy-ethanesulfonyl)-2-nitrophenylazo]-naphthalene. The color change after the absorption of 25% of water is from violet to yellow.

(e) Phenolphthalein. The color change after the absorption of water is from orange-red to colorless.

(f) Phenol red. The color change after the absorption of water is from red to colorless.

EXAMPLE 2

750 g. of phosphorus pentoxide, 250 g. of processed perlite ("Superlite E/70" of Deutsche Perlite GmbH) and 0.1 g. of neutral red are thoroughly mixed. There is produced a desiccant composition which appears colorless.

After the absorption of 25% of water, the desiccant is green. After the absorption of a further 25% of water, the desiccant exhibits a blue color.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A solid desiccant composition with moisture indicator comprising a shaped porous body consisting of 65–85% concentrated sulfuric acid desiccant in mixture with 35–15% of a solid carrier selected from the group consisting of perlite, kieselguhr and vermiculite, and 0.001–1% of a dyestuff which changes color when the desiccant is exhausted, selected from the group consisting of 1-hydroxy-4-(2-sulfo-4, 6-dinitrophenylazo)-naphthalene;
1-hydroxy-2-(2,4-dinitrophenylazo)-naphthalene-disulfonic acid-(3,6);
1-hydroxy-2-[4-(2-hydroxy-sulfonyloxy-ethanesulfonyl)-2-nitrophenylazo]-naphthalene-disulfonic acid-(3,6-; and
1-hydroxy-4-[4-(2-hydroxysulfonyloxy-ethanesulfonyl)-2-nitrophenylazo]-naphthalene.

2. A particulate desiccant composition according to claim 1, wherein the carrier is perlite and the acidic azo dye is 1-hydroxy-4-(2-sulfo-4,6-dinitrophenylazo)-naphthalene.

3. A desiccant composition according to claim 2, consisting of 75 parts by weight of concentrated sulfuric acid, 25 parts by weight of perlite, and 0.01 part by weight of 1-hydroxy-4-(2-sulfo-4,6-dinitrophenylazo)-naphthalene.

4. A solid desiccant composition with moisture indicator comprising a shaped porous body consisting of 65–85% phosprodus pentoxide desiccant in mixture with 35–15% of a solid carrier selected from the group consisting of perlite, kieselguhr and vermiculite and 0.001–1% 3-amino - 6-dimethyl-amino-2-methylphenazine hydrochloride.

5. A particulate desiccant composition according to claim 4, wherein the carrier is perlite.

6. A desiccant composition according to claim 1, consisting of 75 parts by weight of phosprorus pentoxide, 25 parts by weight of perlite, and 0.01 part by weight of 3-amino-6-dimethylamino-2-methyl phenazine hydrochloride.

References Cited

UNITED STATES PATENTS

| | | | |
|---|---|---|---|
| 2,214,354 | 9/1940 | Snelling | 252—194 |
| 2,515,232 | 7/1950 | Kantrowitz | 252—408 |
| 2,950,958 | 8/1960 | Nesh | 252—408 |
| 2,967,154 | 1/1961 | Beerman | 252—194 |
| 2,968,940 | 1/1961 | Feldman | 252—408 |
| 3,173,880 | 3/1965 | Pappas et al. | 252—194 |
| 3,505,020 | 3/1970 | Caldwell | 252—408 |

FOREIGN PATENTS 708,968    8/1941    Germany.

JOHN D. WELSH, Primary Examiner

U.S. Cl. X.R.

252—408